Figure 1:
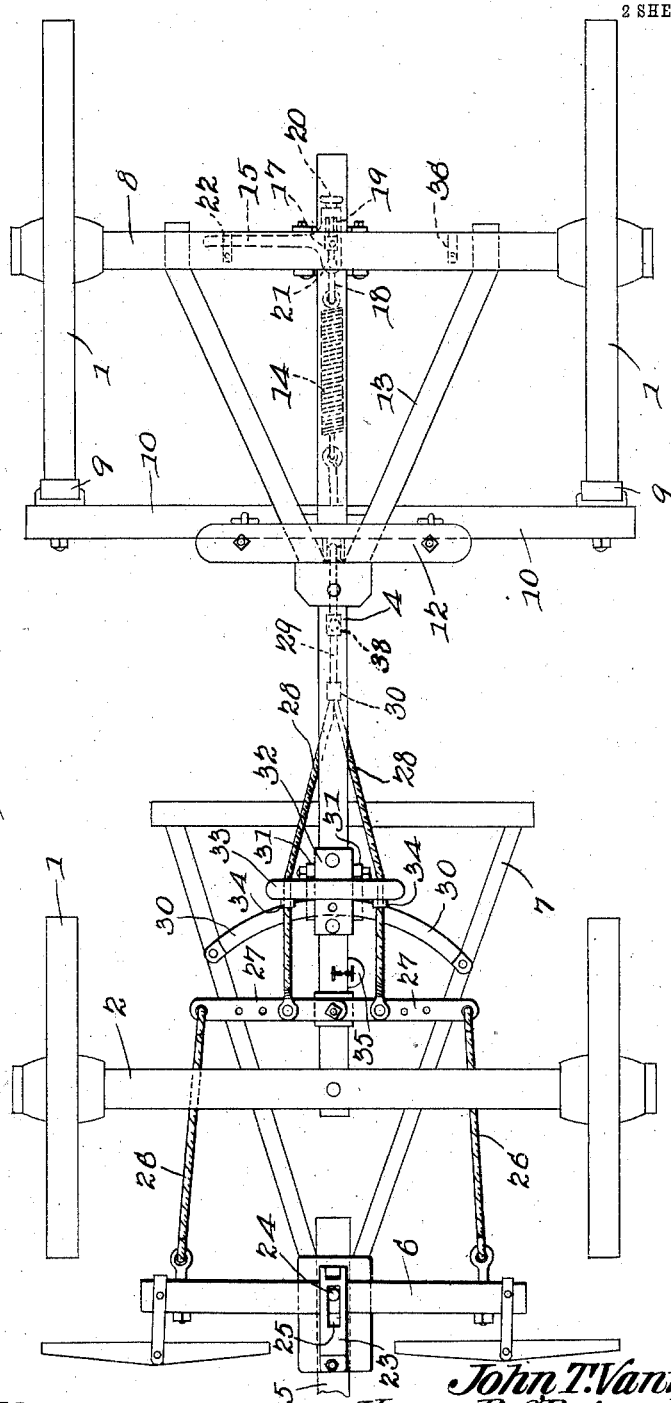

No. 864,814. PATENTED SEPT. 3, 1907.

J. T. VANNESS & H. R. O'BRIAN.
AUTOMATIC BRAKE FOR WAGONS.
APPLICATION FILED JUNE 9, 1906.

2 SHEETS—SHEET 1.

WITNESSES

John T. Vanness,
Harry R. O'Brian INVENTORS

By C. A. Snow & Co
ATTORNEYS

No. 864,814. PATENTED SEPT. 3, 1907.
J. T. VANNESS & H. R. O'BRIAN.
AUTOMATIC BRAKE FOR WAGONS.
APPLICATION FILED JUNE 9, 1906.
2 SHEETS—SHEET 2.
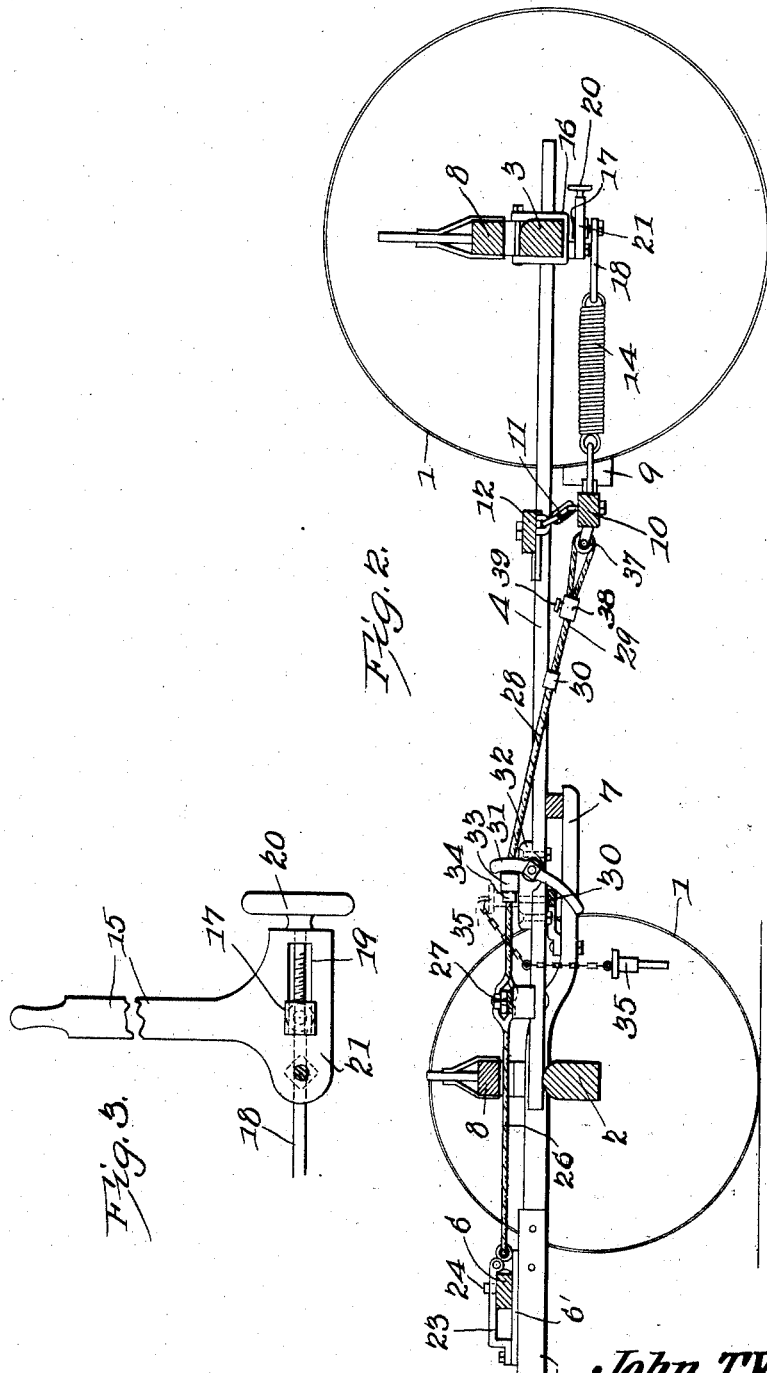
WITNESSES:
John T. Vanness,
Harry R. O'Brian INVENTORS
By
ATTORNEYS

UNITED STATES PATENT OFFICE.

JOHN T. VANNESS AND HARRY R. O'BRIAN, OF OXFORD, OHIO.

AUTOMATIC BRAKE FOR WAGONS.

No. 864,814.  Specification of Letters Patent.  Patented Sept. 3, 1907.

Application filed June 9, 1906. Serial No. 321,059.

*To all whom it may concern:*

Be it known that we, JOHN T. VANNESS and HARRY R. O'BRIAN, citizens of the United States, residing at Oxford, in the county of Butler and State of Ohio, have invented a new and useful Automatic Brake for Wagons, of which the following is a specification.

The present invention relates to automatic brakes intended for use in connection with horse-drawn vehicles, and it relates more particularly to apparatus of this character in which the brake shoes normally tend to frictionally engage the road wheels but are held out of engagement therewith by the horses attached to the wagon.

The invention has for one of its objects to provide an automatic brake mechanism which can be readily applied to wagons already in use or manufactured with wagons intended for the market, without involving any change in standard wagon construction.

A further object is to improve this class of apparatus, so that the brake shoes will engage the wheel with considerable pressure, as when traveling down hill, and can be disengaged by a considerably less power required of the horses than operated to set the brakes.

Another object of the invention is to provide means whereby the brake shoes can be maintained in inoperative position, or disengaged from the wheels, by the horses when the vehicle is backing.

A still further object is to equip the mechanism with a device whereby the tension of the spring can be easily adjusted, or the entire brake mechanism rendered inoperative.

With these and other objects in view, the invention comprises a simple, inexpensive construction and arrangement of parts, hereinafter more fully described, and defined as to its novel features in the claims appended hereto.

In the accompanying drawings, which illustrate one embodiment of the invention, Figure 1 is a plan view of the running gear of a farm wagon showing the brake mechanism applied thereto. Fig. 2 is a longitudinal section of the wagon, and Fig. 3 is a detail view of the device for setting the tension of the spring or rendering the brake mechanism inoperative.

Corresponding parts in the several figures are indicated throughout by similar characters of reference.

Referring to the drawings, it will be seen that the wagon to which the brake mechanism is applied is of the usual standard construction, comprising road wheels 1, front and rear axles 2 and 3, respectively, a coupling pole or reach 4, a tongue 5, a doubletree draft rigging 6, hounds 7, and bolsters 8 for supporting the vehicle body. It is obvious that any other vehicle construction may be employed, since the brake mechanism is adaptable for various kinds of wagons.

The brake shoes 9 are arranged at the ends of a transverse beam 10 located just in front of the rear wheel so that the brake shoes can engage the tires of the latter. The brake carrying beam 10 may be supported from the running gears in any suitable manner, such as by chains 11, links or other devices affording a flexible mounting therefor. The chains are attached to the ends of the cross bars 12 secured to the front end of the brace frame 13 extending between the rear axle and the coupling tongue, and are attached at their lower ends to the brake beam. Extending rearwardly from and attached to the center of the brake beam is a helical extension spring 14 that is anchored at its rear end on the rear axle. The connection between the spring and rear axle is preferably of such a nature as to permit of the tension of the spring being readily adjusted. One form of connection comprises a lever 15 fulcrumed on a clip 16 bolted to the rear axle, and carried by the lever is an adjustable block 17 to which the spring is connected by a link 18. This block is mounted in a slot 19 disposed adjacent the fulcrum of the lever, and is slidable in the slot by means of a set screw 20, clearly shown in Fig. 3. The normal position of the lever is shown in Fig. 1. It will be observed that the link 18 and spring 14 are disposed in a line extending through the fulcrum of the lever and the block 17. In other words, the parts are on a common center line, the block 17 being located at the rear of the fulcrum 21 of the lever. The spring tends to maintain the lever in this position, but for the sake of additional security, a catch 22 is provided on the bottom of the axle to engage the free end of the lever and hold it fixed. If it is desired to adjust the tension of the spring, the lever 15 is disengaged from the catch 22 and rotated through 180°, thereby throwing the block 17 around to the front side of the fulcrum, so that the spring and link are in a more or less slack condition. The set screw can then be adjusted with considerably less effort. When the proper adjustment is made, the lever is again returned to its normal position, so as to restore tension to the spring.

That part of the mechanism which operates in opposition to the spring to maintain the brake shoes in an inoperative position may be generally described as follows. The doubletree 6 is mounted for a slight forward and backward movement in a clasp 23 which is hinged at its rear end to the rubbing plate 6' located under the doubletree and is bolted to the rubbing plate at its front end. The doubletree is held between the clasp and rubbing plate by means of a pin 24 extending through a slot 25 in the clasp and rubbing plate and through the doubletree, itself. Extending rearwardly from the doubletree are two cables, links, or other devices 26, connecting the outer ends of the doubletree with the outer ends of two transversely disposed levers 27 suitably fulcrumed on the front end of the coupling pole at a point slightly to the rear of the front axle. Extending from the levers are two intermediate cables, links, or other devices, 28, that converge toward each other and are coupled to the front end of a rear cable link, or other devices, 29, by means of a suitable coupling, indicated at 30. The rear cable 29 connects at its rear end with the shoe carrying beam 10. By this arrangement, the shoes 9 are moved out of engagement with the rear wheels when power is brought to bear by the horses on the doubletree. In order that the power required to move the brake shoes away from the wheels may be multiplied, so that the effort on the part of the horses can be reduced to a considerable extent, the cables 28 are adapted to be connected with the levers 27 at points nearer to the fulcrums than are the points of connection between the levers and the front cables 26. To illustrate this point, let it be assumed that the spring exerts a pull of about 200 pounds, and, as the cables 28 are connected to the levers 27 about one-third of their lengths from the fulcrum, the power required to overcome the spring, on the part of the horses, will be about sixty-six and two-thirds pounds, disregarding friction and other minor factors. It will thus be seen that the brakes are very sensitive to a power tending to disengage them and hold them in disengaged position.

In order that the vehicle can be backed without the brake shoes offering any impediment thereto, I make use of the upward movement of the tongue, or, more strictly, the downward movement of the hounds 7 caused by the horses doing the backing of the wagon. For this purpose, a segmental bar 30' is mounted on the hounds at a point to the rear of the levers 27, as shown in Fig. 1, with which coöperate vertical levers 31 fulcrumed on the frame 32 that is bolted or otherwise secured to the coupling pole 4. The lower ends of the vertical levers 31 extend forwardly into the path of the segmental bar 30', so that when the latter is lowered during the backing movement, it wipes on the levers and tilts the upper ends thereof in a forward direction. The upper ends of the vertical levers abut a cross bar 33 extending horizontally across the coupling pole and supported in a floating position on the frame 32. The horizontal cross bar 33 is prevented from moving forwardly on the cables 28, on which it is mounted, by means of the collars or stops 34, more clearly shown in Fig. 1. By this arrangement, the forward tilting of the upper ends of levers 31 imparts a forward movement to the cross bar 33 and through the stops 34, cables 28 and 29, the brake carrying bar is held in a forward position with the shoes 9 disengaged from the wheels. It will thus be seen that the vehicle can be backed without the brake shoes engaging the rear wheel and opposing the backing movement.

It sometimes happens that when traveling down an incline with a great load, the frictional engagement of the brake shoes with the wheels will not be sufficient and it may be desirable to supplement the brakes by using the horses, as in ordinary cases. It will be understood that when the horses assist to hold back a load when going down a hill, the front end of the tongue, by reason of their being hitched thereto, is elevated to a considerable height. This means that with my brake mechanism the segmental bar 30 would operate through the lever 31 to withdraw the brake shoes from the wheels just at the time when the braking effect should be maximum. Therefore, it is necessary to provide some emergency device to render the said levers 31 inoperative. One simple manner of accomplishing this is to insert a bolt, pin, or other device, 35, in front of the cross bar 33, so that the same cannot be moved by the levers 31. At all other times, the pin 35 will not be used, and so that it may be always conveniently at hand, it can, with advantage, be attached by a chain to the frame 32, or some other adjacent part.

It may be desirable, at times, to render the brake mechanism inoperative. This can be done by simply taking the tension out of the spring 14. To do this, the lever 15 is turned around on its fulcrum to a position opposite to that shown, and is held in such position by a suitable catch 36.

While we have described a brake mechanism more especially adapted for a double-horse wagon, it is obvious that the same can be readily applied to a single horse-drawn wagon. It is to be noted that with the construction shown, the brake mechanism can be effectively controlled while turning to the right or left, since one of the horses will always maintain the cables 26 sufficiently taut to prevent the brakes from being set.

In order to permit the wagon to be lengthened or shortened, in the usual manner, without the brake mechanism interfering, suitable means is provided in the latter for this purpose. As, for instance, the rear end of the cable 29 is adapted to be doubled over a roller 37, or equivalent device, on the brake beam 10, and the free end of the cable is secured by means of an adjustable coupling or fastening device 38, including a set screw 39. By this means, the cable 29 can be shortened or lengthened to accommodate the changing of the length of the wagon.

We have described the principle of operation of the invention, together with the apparatus which we now consider to be the best embodiment thereof, but we desire to have it understood that the apparatus shown is merely illustrative, and that various changes may be made, when desired, as are within the scope of the invention.

What is claimed is:—

1. In a brake mechanism, the combination with a vehicle, of a brake beam therefor, brake shoes, a draft device, means connected with the brake beam for holding the shoes in contact with the wheels of the vehicle, a system of levers and connections between the draft device and brake beam for multiplying the power exerted by the draft device to move said beam to inoperative position, and automatic means controlled by the draft device for rendering said system of levers and connections inoperative when backing the vehicle.

2. In a brake mechanism, the combination with a vehicle comprising running gears and a draft device, a brake beam, shoes thereon for engaging the wheels of the vehicle, means tending to hold the brake shoes in an operative position, and a mechanism between the brake beam and draft device for holding the brake shoes in off position when power is exerted on the draft device for moving the vehicle in either a forward or reverse direction, said mechanism comprising means connecting the draft device with a brake beam, and means operatively related to the first means for holding the brake beam in off position by the upward movement of the tongue of the draft device caused by the horses during the backing movement.

3. In a brake mechanism, the combination with a vehicle comprising running gears and a draft device, a brake beam, shoes thereon for engaging the wheels of the vehicle, means tending to hold the brake shoes in an operative position, and a mechanism between the brake beam and draft device for holding the brake shoes in off position when power is exerted on the draft device for moving the vehicle in either a forward or reverse direction, said mechanism comprising a connection between the draft device and brake beam, a lever mounted on the vehicle, means which is actuated with the tongue of the draft device when the same is raised during the backing of the vehicle, and means between the said connection and the lever whereby the lever operates through the connection to hold the brake beam in inoperative position.

4. In combination, a brake beam, a draft device, flexible members connecting the two, a floating cross bar carried by the members, a lever adapted to engage the cross bar, and means for actuating the lever when the tongue of the draft device is moved in a vertical plane.

5. In combination, a brake beam, a draft device, members flexibly connected with the beam and device, a cross bar carried by the members, a lever for engaging the cross bar, and a segmental member adapted to engage the lever when the tongue of the draft device is raised.

6. In combination, a brake beam, a draft device, members extending rearwardly from the draft device, levers to which the rear ends of said members are connected, two connecting members extending from the levers to the brake beam and adjustably connected to the said levers, and a mechanism engaging the latter connecting members for holding the brake beam in off position during the backing of the vehicle.

7. In combination, a brake beam, a draft device, members extending rearwardly from the draft device, levers to which the rear ends of said members are connected, two connecting members extending from the levers to the brake beam, a mechanism engaging the latter connecting members for holding the brake beam in off position during the backing of the vehicle, said mechanism being operated by the vertical movement of the tongue on the draft device.

8. In combination, a draft device including a tongue, a coupling pole, a brake beam, levers pivoted on said coupling pole, connections extending from the levers respectively to the draft device and brake beam, a frame on the coupling pole, levers mounted on the frame, connections between the levers and the connections extending from the first levers to the brake beam, and means on the draft device actuated by the said tongue for operating the second levers.

9. In combination, a draft device including a tongue, a brake beam, a spring tending to draw the beams toward the wheels of the vehicle, connections between the brake beam and draft device, a pair of vertically extending levers adapted to engage said connections for holding the beams away from the wheels, and means for actuating the levers during the vertical movement of the said tongue during the backing of the vehicle.

10. In combination, a draft device including a tongue, a coupling pole, a brake beam, horizontal levers pivoted on the coupling pole, members connecting the levers respectively with the draft device and brake beam, vertically disposed levers pivoted on the coupling pole, connections between the levers last mentioned and certain of said members for holding the brake beam in off position, and means for actuating the vertical levers by the movement of the tongue.

11. In combination, a draft device including a tongue, a coupling pole, a brake beam, connections between the brake beam and draft device, a cross member thereon, means for engaging the cross member to hold the brake beam in off position when the vehicle is backed, and a pin mounted in the coupling pole in front of the cross member to render the latter inoperative.

12. In combination, a draft device including a tongue, a coupling pole, a brake beam, connections between the brake beam and draft device, a cross member thereon, a frame on the coupling pole, levers supported on the frame for engaging the cross member to hold the brake beam in off position when the vehicle is backed, and a pin adapted to be mounted in said frame in front of the cross member to render the latter inoperative.

13. In combination, a draft device, a coupling pole, a brake beam, a mechanism connecting the brake beam and draft device, said mechanism comprising connecting members, a frame on the coupling pole, a cross bar disposed transversely of the frame, vertical levers arranged on opposite sides on the frame and engaging the rear of the cross bar, and means carried by the draft device for engaging the free ends of said levers.

14. In combination, a draft device, a brake beam, operating connections between the two for holding the brake beam in off position, a spring arranged to hold the brake beam in set position, an adjustable block attached to the spring, a screw for actuating the block, a lever carrying the block and screw which is adapted to render the spring inoperative, and means for supporting the lever.

15. In combination, a draft device, a brake beam, operating connections between the two for holding the brake beam in off position, a spring arranged to hold the brake beam in set position, an adjustable means for varying the tension of the spring, a lever supporting said means which is adapted to relieve the tension of the spring to permit of the latter being adjusted by said means and to render the spring inoperative, and means for supporting the lever.

In testimony that we claim the foregoing as our own, we have hereto affixed our signatures in the presence of two witnesses.

JOHN T. VANNESS.
HARRY R. O'BRIAN.

Witnesses:
P. J. FABER,
BERT BOURNE.